United States Patent
Shiner et al.

(10) Patent No.: US 11,552,858 B2
(45) Date of Patent: Jan. 10, 2023

(54) REINFORCEMENT LEARNING FOR OPTICAL NETWORK RE-GROOMING

(71) Applicant: Ciena Corporation, Hanover, MD (US)

(72) Inventors: Andrew D. Shiner, Ottawa (CA); Benoît Châtelain, Rosemère (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 17/101,089

(22) Filed: Nov. 23, 2020

(65) Prior Publication Data
US 2022/0166683 A1 May 26, 2022

(51) Int. Cl.
| | | |
|---|---|---|
| *G06F 15/173* | (2006.01) | |
| *H04L 41/16* | (2022.01) | |
| *H04B 10/077* | (2013.01) | |
| *H04L 41/12* | (2022.01) | |
| *H04L 41/14* | (2022.01) | |

(52) U.S. Cl.
CPC .......... *H04L 41/16* (2013.01); *H04B 10/0773* (2013.01); *H04L 41/12* (2013.01); *H04L 41/14* (2013.01)

(58) Field of Classification Search
CPC ......... H04L 41/16; H04L 41/12; H04L 41/14; H04B 10/0773
See application file for complete search history.

(56) References Cited

U.S. PATENT DOCUMENTS

| | | |
|---|---|---|
| 7,783,194 B2 | 8/2010 | Hyndman et al. |
| 8,364,036 B2 | 1/2013 | Boertjes et al. |
| 8,553,586 B2 | 10/2013 | Smith et al. |
| 8,666,247 B2 | 3/2014 | Srinivasan et al. |
| 9,071,532 B2 | 6/2015 | Oltman et al. |
| 9,167,318 B1 | 10/2015 | Connolly et al. |
| 9,831,947 B2 | 11/2017 | Boertjes |
| 9,828,296 B2 | 12/2017 | Armolavicius et al. |
| 10,097,263 B2 | 10/2018 | Shiner et al. |
| 10,298,356 B1 | 5/2019 | Châtelain et al. |
| 10,491,501 B2 | 11/2019 | Armolavicius et al. |
| 10,587,339 B1 | 3/2020 | Al Sayeed et al. |

(Continued)

OTHER PUBLICATIONS

Gagan Choudhury et al., J. Opt. Commun. Netw./vol. 10, No. 10, Two Use Cases of Machine Learning for SDN-Enabled IP/Optical Networks: Traffic Matrix Prediction and Optical Path Performance Prediction [Invited], Optical Society of America, Oct. 2018, pp. 52-62.

(Continued)

*Primary Examiner* — Padma Mundur
(74) *Attorney, Agent, or Firm* — Clements Bernard Baratta; Lawrence A. Baratta, Jr.; Christopher L. Bernard

(57) ABSTRACT

Systems and methods include obtaining a network state of a network having a plurality of nodes interconnected by a plurality of links and with services configured between the plurality of nodes on the plurality of links; utilizing a reinforcement learning engine to analyze the services and the network state to determine modifications to one or more candidate services of the services to increase a value of the network state; and, responsive to implementation of the modification to the one or more candidate services, updating (Continued)

the network state based thereon. The modifications can include changes to any of routing, modulation, and spectral assignment to the one or more candidate services.

19 Claims, 7 Drawing Sheets

(56) References Cited

U.S. PATENT DOCUMENTS

| | | | |
|---|---|---|---|
| 2013/0236169 A1 | 9/2013 | Gaudette et al. | |
| 2015/0333862 A1 | 11/2015 | Swinkles et al. | |
| 2016/0050470 A1 | 2/2016 | Swinkles et al. | |
| 2016/0301579 A1 | 10/2016 | Djukic et al. | |
| 2018/0359029 A1 | 12/2018 | Shiner et al. | |
| 2019/0123974 A1* | 4/2019 | Georgios | G06N 3/084 |
| 2019/0149425 A1* | 5/2019 | Larish | H04L 43/08 706/16 |
| 2019/0326992 A1 | 10/2019 | Charlton et al. | |
| 2020/0007965 A1 | 1/2020 | Swinkles et al. | |
| 2020/0036468 A1 | 1/2020 | Roberts et al. | |
| 2021/0099378 A1* | 4/2021 | Alaettinoglu | H04L 41/16 |
| 2021/0211371 A1* | 7/2021 | Ceccarelli | H04L 45/123 |
| 2021/0406147 A1* | 12/2021 | Li | G06F 11/3433 |

OTHER PUBLICATIONS

Xiaoliang Chen et al., DeepRMSA: A Deep Reinforcement Learning Framework for Routing, Modulation and Spectrum Assignment in Elastic Optical Networks, arXiv:1905.02248v2 [cs.NI], May 15, 2019, pp. 1-7.

Diederik P. Kingma et al., ADAM: a Method for Stochastic Optimization, Published as a conference paper at ICLR 2015, arXiv:1412.6980v9 [cs.LG], Jan. 30, 2017, pp. 1-15.

Volodymyr Mnih et al., Human-level control through deep reinforcement learning, LETTER doi:10.1038/nature14236, Feb. 26, 2015, vol. 518, 14 Pages.

Xiaoliang Chen et a., Deep-RMSA: A Deep-Reinforcement-Learning Routing, Modulation and Spectrum Assignment Agent for Elastic Optical Networks, ResearchGate, Conference Paper, Dec. 2017, pp. 1-4.

* cited by examiner

REINFORCEMENT LEARNING FOR OPTICAL NETWORK RE-GROOMING

FIELD OF THE DISCLOSURE

The present disclosure generally relates to network optimization. More particularly, the present disclosure relates to systems and methods for Reinforcement Learning in optical network re-grooming.

BACKGROUND OF THE DISCLOSURE

Optical networks, as described herein, include Layer 0 (photonic) and/or Layer 1 (Time Division Multiplexed (TDM) layers that provide connectivity between network nodes. As is known in the art, an optical network includes network elements interconnected via network links (optical fibers). At Layer 0, the connectivity is via optical channels that occupy the optical spectrum on the optical fibers. At Layer 1, the connectivity is via TDM connections such as Optical Transport Network (OTN) connections. As described herein, optical channels and TDM connections can be referred to as services. Optical networks are dynamic, meaning services are continually added, deleted, moved, etc. As such, an optical network can become fragmented, meaning services are not optimally routed. Network operators perform de-fragmentation or re-grooming to rearrange services more optimally.

There are various techniques known in the art for improving, i.e., defragmenting, a network. For example, commonly-assigned U.S. Pat. No. 10,298,356, Châtelain et al., "Optimal partial reconfiguration of Spectrum in Optical Networks," the contents of which are incorporated herein by reference, describes techniques for finding a sequence of steps to defragment a network to minimize wavelength use. Châtelain et al. describes several techniques, such as Integer Linear Programming (ILP), Tabu searches, and Genetic Algorithms (GA). The GA approach for partial re-grooming relies on a two-step optimization procedure: (1) identifying the services to re-groom (to re-configure) that yield the greatest spectrum recovery, and (2) determining the sequence in which the services need to be re-groomed to minimize the spectrum assignment conflicts between services, and the number of maintenance windows. The figure of merit used by the GA in the first step is essentially a measure of maximum link congestion. When performing re-grooming, the GA elects the candidates that maximally reduce link congestion, therefore increasing overall network capacity.

An ILP formulation has also been proposed for re-grooming, in Jaumard, Brigitte, Hamed Pouya, and David Coudert. "Wavelength De-fragmentation for Seamless Migration." Journal of Lightwave Technology 37.17 (2019): 4382-4393, the contents are incorporated by reference. In this case, an ILP framework combined with a heuristic to identify dependencies and possible spectrum assignment conflicts are used to determine the route and/or spectrum assignment of the services to re-groom. The procedure also determines the sequence in which the services are to be re-configured. This is achieved in a single step, where the figure of merit is the blocking rate, defined as the number of services that were successfully deployed over the total number of services to add.

Both the GA and ILP based re-grooming approaches suffer from the same fundamental issues as described as follows. These approaches are limited in considering multiple signals from the network, such as spectral occupancy of each edge. This severely limits their adaptability in de-fragmentation scenarios that are often driven by varying and evolving customer preferences and objectives. These approaches have limited utility for making incremental changes to a network. For example, if one wants to make a few changes now and update the de-fragmentation solution later if the network state changes. This is often required since re-grooming operations are usually performed over a long time span due to the need for interrupting services and setting up maintenance windows. Furthermore, while re-grooming operations are conducted, new services may be added to the network, further complicating the task. The GA and ILP frameworks cannot cope with these dynamic changes.

With these approaches it is difficult to design systems which can present an operator with options for possible changes to make at a given de-fragmentation step along with their expected values. Operators may wish to select defragmentation actions based on a number of factors such as those which are easily captured by a cost for example latency, as well as intangible measures such as which parts of the network have historically been more challenging to work on. For example, at any given step, a network operator may want to prioritize services that are using a given set of edges or prioritize a certain type of services. GA and ILP only consider history within the current simulation run. They cannot generalize to other starting points, and they cannot learn from previous de-fragmentation outcomes. These approaches do not include topology information or any other signals from the network and only rely on single figure of merit that cannot capture the complexity of real-life re-grooming operations. Finally, ILP becomes difficult or impossible to solve for large networks.

Reinforcement learning (RL) is an area of machine learning inspired by behaviorist psychology, and, in the context of networks, it is concerned with how software agents ought to take actions in an environment to maximize some notion of cumulative reward. In general, RL seeks to learn what to do given a problem, i.e., an optimal mapping from its current state to some action, to maximize the received reward signal in the long-run. Often, a software agent does not have any a priori knowledge of its operating environment and must discover which actions yield the most reward by trying them out. This leads to the trade-off between exploration and exploitation. The agent must exploit what it already knows to obtain rewards but also needs to explore to make better actions in the future.

In N. C. Luong et al., "Applications of Deep Reinforcement Learning in Communications and Networking: A Survey," arXiv:1810.07862v1, Oct. 18, 2018, the contents of which are incorporated herein by reference, the authors describe several applications of reinforcement learning in network optimization. Examples include path routing for wireless networks, traffic engineering, and routing. These are two examples of existing network de-fragmentation, and various other similar publications are known. Commonly-assigned U.S. Patent Application Publication No. 20190138948, entitled "Reinforcement learning for autonomous telecommunications networks," filed Nov. 9, 2018, the contents are incorporated by reference, describes various techniques for optimizing packet services.

Some aspects of reinforcement learning in optical networks are described in X. Chen et al., "Deep-RMSA: A Deep Reinforcement-Learning Routing, Modulation and Spectrum Assignment Agent for Elastic Optical Networks" OFC 2018, and X. Chen et al., "DeepRMSA: A Deep Reinforcement Learning Framework for Routing, Modulation and Spectral Assignment" arXiv 2019, the contents of each are incorporated by reference. In the 2018 paper, Chen et al. employ a state space for a given service request that consisted of the source and destination nodes as well as the requested bandwidth and the full spectral utilization of all links on a small eight edge, six node network with 64 spectral slices per edge. A Routing, Modulation and Spectrum Assignment (RMSA) algorithm was used to find the k-shortest paths for each service request, and the RL algorithm learned to pick which of the k paths to use in order to minimize the future blocking probability. Of note, the action space contained the full spectral utilization of each edge but they do not indicate which edges a given path crosses. The RL agent needed to learn the behavior of the RMSA algorithm so it could infer the relationship between path index k for a source-destination pair and the spectral utilization on each edge that is crossed by that path. It is expected that this would have made training difficult, and the solution very sensitive to any change in network state for the behavior of the RMSA algorithm. Note that Chen et al. is addressing the RMSA problem and not attempting to re-groom the optical network.

In the 2019 paper, Chen et al. describe an RL framework for selecting the best path and wavelength assignment for a given service request to avoid future blocking. In their approach, a service request arrives, and an RMSA algorithm determines the k-shortest paths between the source and destination nodes as well as J possible spectral assignments for each path. For each of the K×J combinations, it also captures the starting index and spectral width of the assigned spectrum as well as the average size and number of available spectral slices along the path. With this information, the RL algorithm used an action-based method to select the best path and spectral assignment from the K×J possibilities that were presented at each time step. This approach was shown to reduce blocking probability by 20.3%. Chen et al.'s algorithm is presented with very limited network topology and spectral fill information, which is mostly limited to path-based metrics of the starting index of the first available spectral window and measures of available bandwidth along that path. There are no obvious means for the Deep Neural Network (DNN) to consider spectral utilization on edges which are close to the ones used by the kth path or even to understand the relationship between paths used by different A-Z service requests. The state and action spaces are limited to the source and destination nodes and measures of spectral utilization along each of the paths determined by the RMSA algorithm. It does not contain information about which edges are contained in the path.

Of note, these aforementioned approaches do not suggest or describe using reinforcement learning for re-grooming an optical network.

BRIEF SUMMARY OF THE DISCLOSURE

The present disclosure relates to systems and methods for Reinforcement Learning (RL) in optical network re-grooming. The present disclosure utilizes RL for Layer 0 or Layer 1 re-grooming, including being adaptable to changing network conditions, presenting an operator with possible re-grooming actions, presenting the operator with a quantitative benefit for each possible action for a given de-fragmentation (re-grooming) step, and the like. The approach includes a per-edge fragmentation metric as part of the state space, an edge-crossing vector (length |E|) to indicate which edges a service crosses when evaluating the action of moving that service, and evaluation of a current and potential new path for a service where the current and new paths are each represented with edge-crossing vectors in the action space.

In various embodiments, a method includes steps, a server is configured to implement the steps and a non-transitory computer-readable medium includes instructions stored thereon for programming one or more processors to performs the steps. The steps include obtaining a network state of a network having a plurality of nodes interconnected by a plurality of links and with services configured between the plurality of nodes on the plurality of links; utilizing a reinforcement learning engine to analyze the services and the network state to determine modifications to one or more candidate services of the services to increase a value of the network state; and, responsive to implementation of the modification to the one or more candidate services, updating the network state based thereon.

The modifications can include changes to any of routing, modulation, and spectral assignment to the one or more candidate services. The modifications can include any of adding physical hardware to the network, migrating the one or more candidate services to use higher capacity modems, and grouping channels together into a media channel. The reinforcement learning engine can be configured to evaluate the network state and provide the modifications to one or more candidate services each providing some increase in the value of the network state. The network state can include signals sensitive to any of topology of the network, link utilization, link spectral fragmentation, link participation in earlier blocking events, cost to increase link optical bandwidth, link contribution to latency, link optical path length, link path redundancy, customer supplied value, and value returned by a value function.

The value of the network state can be quantified by values for the services based on any of source node, destination node, links which a corresponding service crosses, path length relative to a shortest path in the absence of spectral contention, difficulty to route, latency, cost of disrupting the corresponding service, and customer value. The reinforcement learning engine can include a determination of a reward after each action that includes the modification, wherein the reward is utilized to determine the value of the network state, and wherein the reward is determined from any of fragmentation, survivability, latency, capacity, and output of a customer supplied value function. The steps can further include training the reinforcement learning engine for estimating a cumulative reward with respect to the value of the network state for each of the modifications. The estimating can be based on any of a parameterized deep neural network, a parameterized function, and a lookup table. The estimating can be determined through one or more of simulation of events on the network and analyzing historical network data. The implementation can be based on an opportunity in the network. The services can include any of optical channels and Time Division Multiplexed (TDM) channels.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
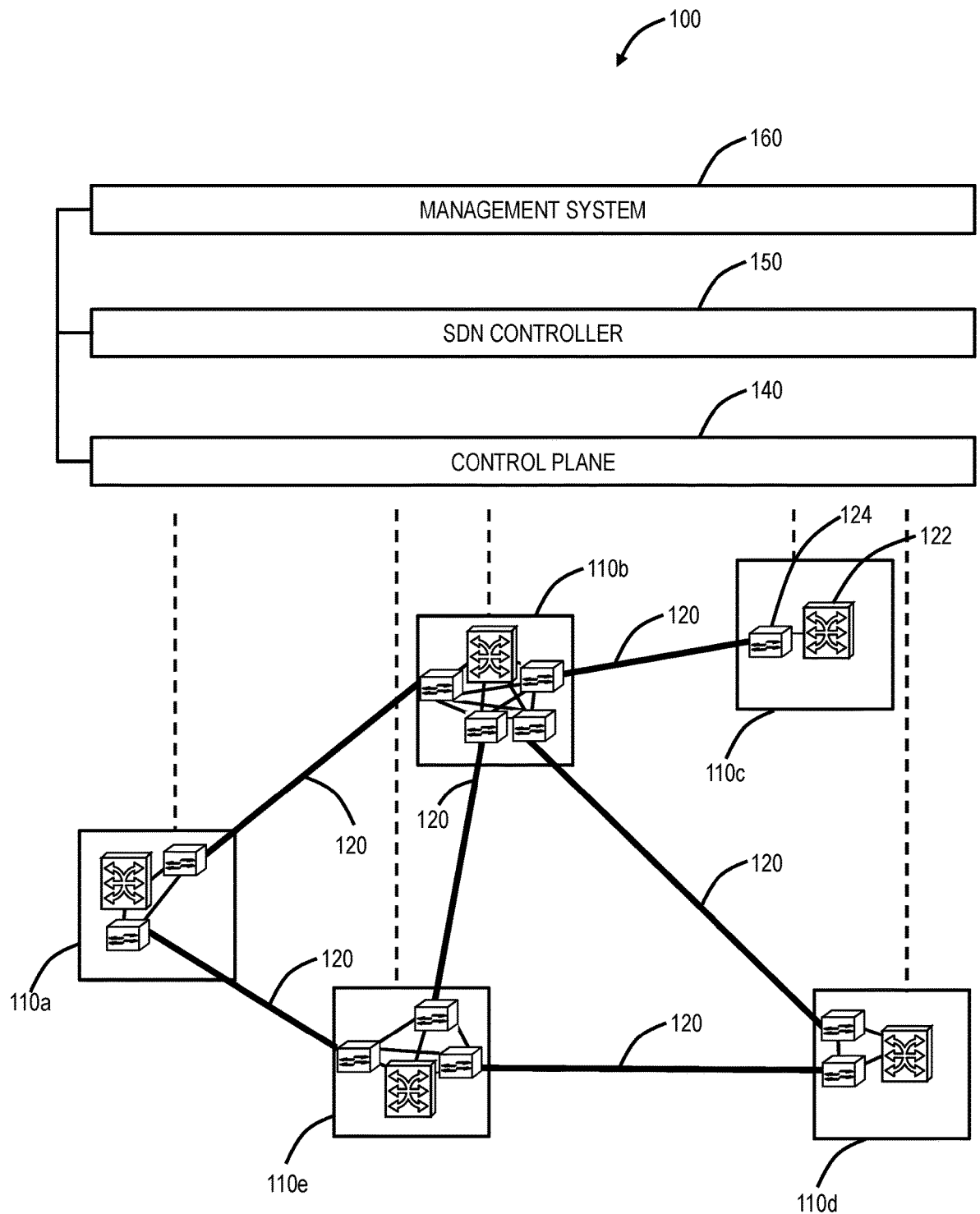
FIG. 1 is a network diagram of a network with five interconnected sites.

In various embodiments, the present disclosure relates to systems and methods for Reinforcement Learning (RL) in optical network re-grooming. The present disclosure utilizes RL for Layer 0 or Layer 1 re-grooming, including being adaptable to changing network conditions, presenting an operator with possible re-grooming actions, presenting the operator with a quantitative benefit for each possible action for a given de-fragmentation (re-grooming) step, and the like. The approach includes a per-edge fragmentation metric as part of the state space, an edge-crossing vector (length |E|) to indicate which edges a service crosses when evaluating the action of moving that service. The evaluation may also include one or more possible new paths for a service where the current and new paths are represented with edge-crossing vectors in the action space. As described herein, the terms de-fragmentation and re-grooming may be used interchangeably.

The present disclosure has several distinct advantages over existing approaches:

1) The Q-function is trained by simulating re-grooming of the network and can also incorporate training examples from other networks. Once trained, a Q-function can interpolate to cases that it has not seen before as long as they are similar to examples in the training set. The Q-learning approach has the ability to generalize. The Q-learning approach is a model-free reinforcement learning approach to learn the quality of actions telling an agent what action to take under what circumstances. It does not require a model (i.e., "model-free") of the environment, and it can handle problems with stochastic transitions and rewards without requiring adaptation.

2) At each re-grooming step, the present disclosure can include an estimate for the future benefit for each possible re-grooming action. This puts control back in the operator's hands, who may be more comfortable taking one of the actions with the slightly lower expected benefit.

3) This solution can generate and report a complete re-rooming plan, but in contrast to conventional approaches, the approach makes it straightforward to adapt that plan to changing network conditions. Often, in most cases, a de-fragmentation or re-grooming plan is developed for a network, but the plan ends up not being implemented because the network has changed by the time the plan is ready to be used. Another problem is that existing solutions usually require all of the steps in the plan to be completed in order before anything else in the network changes. This usually proves impractical for large networks.

4) The nature of the RL process described herein is well suited to continuous operation and training as part of a network's management system and would support opportunistic de-fragmentation (re-grooming). Opportunistic de-fragmentation is described in commonly-assigned U.S. patent application Ser. No. 16/868,991, filed May 7, 2020, and entitled "Opportunistic network de-fragmentation and optimization," the contents of which are incorporated by reference herein. In general, opportunistic de-fragmentation involves adapting the defragmentation solution to take advantage of changes to the network that occur during network operations such as maintenance activities, faults etc. The idea here is to minimize the network impact of defragmentation (re-grooming) operations.

5) In addition to selecting and ordering services to re-route, this framework can learn to suggest optimal routing parameters given network conditions.

Contrarily to the proposed RL approach, the GA and ILP frameworks cannot cope with these dynamic changes. By considering multiple choices and actions at each step, the proposed RL approach can provide this level of customization. Also, since the proposed RL approaches are trained over a wide variety of de-fragmentation exercises (in simulation), it has better knowledge of the actions that lead to optimal results and can take better decisions.

Also, the present disclosure can include the use of a fragmentation score to capture the state of each edge, which is a lot more compact than presenting the full spectrum for all edges to the Q-network. Furthermore, when considering a service to re-route, the present disclosure can indicate which edges that service crosses as part of the action arguments into the Q-function. An extension to the approach is described where the RL engine evaluates the value of each of the k-suggested alternative paths for a service from an RMSA algorithm. In that design, the edges which are crossed by an alternative path are also provided to the Q-function as part of the action vector.

Network

FIG. 1 is a network diagram of a network 100 with five interconnected sites 110a, 110b, 110c, 110d, 110e. The sites 110 are interconnected by a plurality of links 120, i.e., fiber spans. Those skilled in the art recognize a physical link 120 can include one or two optical fibers for bidirectional communication. Each of the sites 110 can include a switch 122 and one or more WDM network elements 124. The switch 122 is configured to provide services at Layers 1 (e.g., Optical Transport Network (OTN)) and/or Layer 2 (e.g., Ethernet, Multiprotocol Label Switching (MPLS)) and/or Layer 3 (e.g., Internet Protocol (IP)) where the switch would normally be called a router. For simplicity of disclosure herein, it will be referred to as a switch. The WDM network elements 124 provide the photonic layer (e.g., Layer 0) and various functionality associated therewith (e.g., multiplexing, amplification, optical routing, wavelength conversion/regeneration, local add/drop, etc.). Of note, while shown separately, those of skill in the art will recognize that the switch 122 and the WDM network elements 124 may be realized in the same network element. For example, a switch 122 can include pluggable transceivers that provide DWDM. The photonic layer and the photonic control operating thereon can also include intermediate amplifiers and/or regenerators on the links 120, which are omitted for illustration purposes. The network 100 is illustrated, for example, as an interconnected mesh network, and those of skill in the art will recognize the network 100 can include other architectures, with additional sites 110 or with fewer sites, with additional network elements and hardware, etc.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 140 operating on and/or between the switches 122 at the sites 110a, 110b, 110c, 110d, 110e. The control plane 140 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. In an embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100, and the control plane 140 can utilize any type of control plane for controlling the switches 122 and establishing connections.

There are various techniques for data communications between the switches 122, the WDM network elements 124, the control plane 140, an SDN controller 150, and/or a management system 160 for OAM&P purposes. The management system 160 can be a processing device that supports OAM&P functions for the optical network 100. The management system 160 can be referred to as a Network Management System (NMS), an Element Management System (EMS), a Craft Interface (CI), etc. The management system can connect directly to the switches 122 and/or network elements 124, as well as connect through any of the control plane 140, the SDN controller 150, etc. The management system 160 is configured to provide a Graphical User Interfaces (GUI) for visualizing networking functions, as described herein.

The control plane 140, the SDN controller 150, the management system 160, or some other server or processing device, as well as a combination thereof, is configured to perform path computation and creation for connections; network-level protection and restoration; and the like, including the various techniques described herein for re-grooming.

Example Server Architecture

Figure 2:
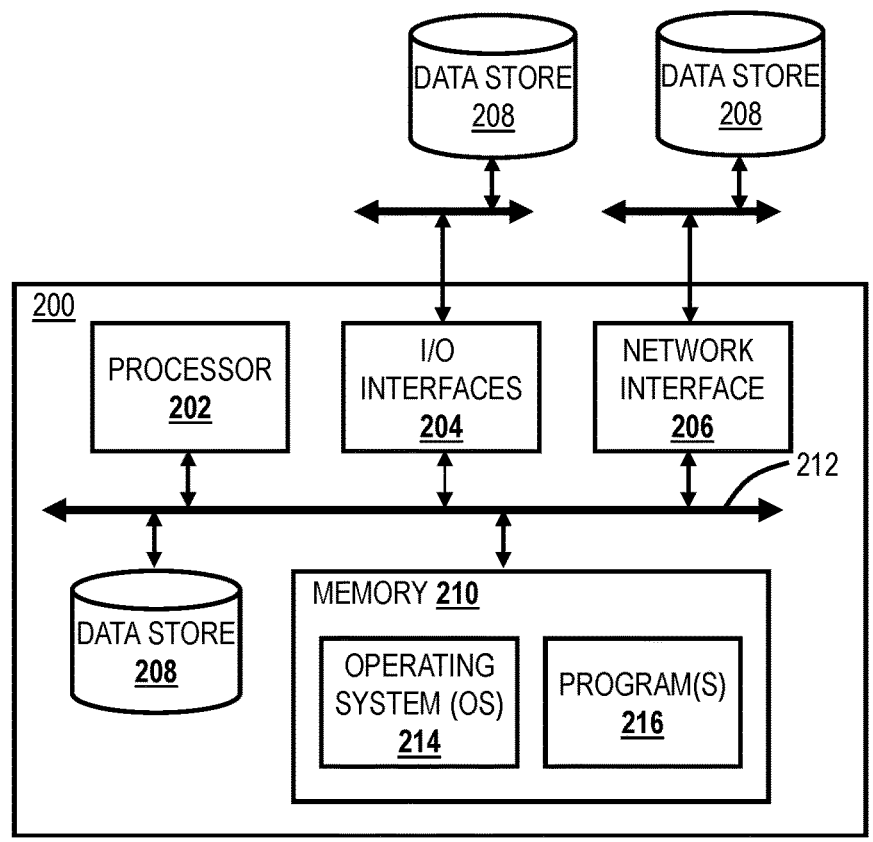
FIG. 2 is a block diagram of a server.

FIG. 2 is a block diagram of a server 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

De-Fragmentation

Over time networks become congested. It may not be possible to deploy new services because the available spectrum is either not contiguous or is misaligned along the desired paths. These are both examples of fragmentation. For an existing set of connections, it might be possible to reduce network fragmentation by changing their spectral allocation or routing them differently.

In a typical flow, an operator may wish to defragment all or part of their network. A static 'snapshot' of the network is taken to develop a de-fragmentation plan. This plan may include tens or hundreds of steps (service affecting wavelength and or route changes) to be performed on the frozen network through a sequence of maintenance windows. Generally, operators have often not chosen to pursue the de-fragmentation plans because of the associated costs. In large networks, it is difficult to prevent changes to the network from the time that work begins on developing a de-fragmentation plan until the time that the series of de-fragmentation steps is completed.

A network can be described by its graph $\mathcal{G}$, which contains the set of nodes, edges that connect the nodes and demands or services carried by the network. Any change to the network will modify its graph. The initial network state $\mathcal{G}_0$ has some value $v_0$ which includes the services the network is carrying today along with its potential for carrying more services in the future. De-fragmentation finds some new state $\mathcal{G}_f$ that is connected to the initial state through a series of intermediate states $\mathcal{G}_0 \to \mathcal{G}_1 \to \mathcal{G}_2 \to \ldots \mathcal{G}_f$. The transitions between states involve things like service impacting maintenance windows. The transition costs between neighboring states are accounting as $\mathcal{C}_{T:0\to 1} + \mathcal{C}_{T:1\to 2} + \ldots + \mathcal{C}_{T:(f-1)\to f}$. To be worthwhile, the value of the final state less all of the transition costs to reach that state must be greater than the initial state. For classical de-fragmentation, operators have almost always concluded that it is not worth it.

De-Fragmentation Illustration

Imagine there is a network that is fragmented. One of the connections (i.e., services), for example, must not be disturbed. The transition cost for taking down services on that connection is infinite. In an embodiment, a de-fragmentation plan is determined, which moves services from their current state to some new state, which maximizes the value of the new state discounted by the transition costs. The services that cannot be disturbed are ignored because their transition costs are infinite (even though a much better final state might exist if they could be moved). The de-fragmentation plan can only be justified if the value of the final state $v_f$ less the transition costs is (substantially) more than that of the current state $v_0$, namely:

$$v_0 < v_f - \Sigma_{i=1}^{f} \mathcal{C}_{T:(i-1)\to i}.$$

Opportunistic De-Fragmentation

Again U.S. patent application Ser. No. 16/868,991 describes opportunistic de-fragmentation. Here, de-fragmentation can be operated continuously in real-time. An opportunistic de-fragmentation engine maintains the de-fragmentation plan for the network. The de-fragmentation plan can be implemented in pieces over time; i.e., it does not all have to be done at once because the engine adapts to changing network conditions. That is, de-fragmentation should not be seen as a major campaign requiring months of planning. The engine monitors the network for opportunities to improve the de-fragmentation plan. Opportunities are events that naturally occur in the network which were not initiated for the purpose of enabling de-fragmentation but which might be exploited to benefit de-fragmentation.

Examples of opportunities that present during normal network operations, which may be exploited to benefit de-fragmentation, can include fiber cuts and equipment failures, maintenance windows, changes in network demand (immediate and long term), and the like. The opportunities can also include anything that changes the optimum de-fragmentation plan, such as the placement of new services, changes in fiber cut probability, etc. The placement of new services can be seen as a special case of de-fragmentation where a path is found under the constraint that moving existing services may not be allowed or comes at high cost. The choice of path for a new service may consider the defragmentation plan and that plan may be updated to reflect the presence of the new service. Fiber cut probability distributions may be used to inform the choice and ordering of restoration paths. Those choices may change to reflect changes in the fiber cut probability distributions.

Network Planning, Deployment, and De-Fragmentation

Figure 3:
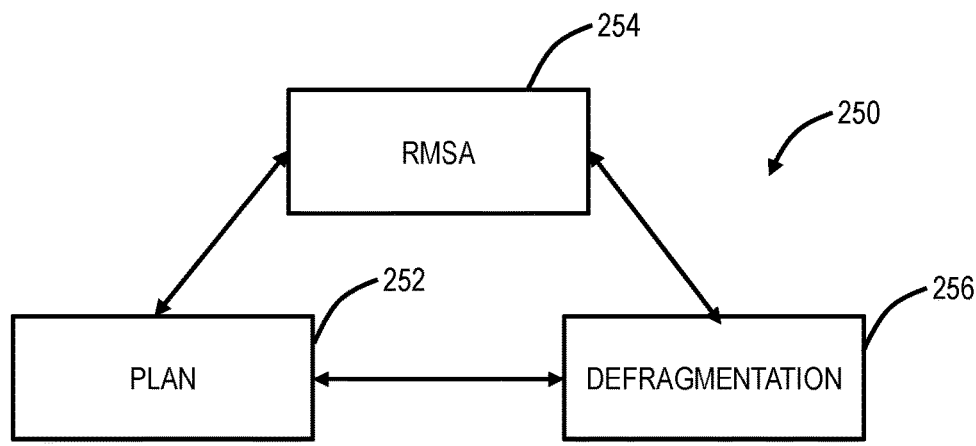
FIG. 3 is a diagram of components associated with network planning, deployment, and de-fragmentation.

FIG. 3 is a diagram of components 250 associated with network planning, deployment, and de-fragmentation. The components include a planning component 252, an RMSA component 254, and a de-fragmentation component 256. The planning component 252 may include determining which routes are expected to become more congested (e.g., this can be used to tune RMSA). The planning component 252 may also reflect the anticipated demand set, optical layer capabilities (e.g., modem technologies), RMSA routing requirements, upcoming maintenance activities, anticipated technology improvements as well as the market strategy and fault restoration plan(s) for each service. This may be determined in whole or in part by the planning service or provided to it from external sources.

The RMSA component 254 is configured to route services with an objective to avoid future blocking and fragmentation. The RMSA component 254 can consider anticipated future demand sets and the network plan. The de-fragmentation component 256 (can be referred to as the de-fragmentation engine) is configured to re-route (change the physical links) and/or recolor (change the optical spectrum) to reduce fragmentation. The de-fragmentation component 256 can generate a multi-step de-fragmentation plan, consider the viability of new routes—RMSA, and can understand the value of current and future network states. The de-fragmentation component 256 can predict what routes will be contentious in the future and have close interaction with the network plan.

De-Fragmentation Use Cases

Figure 4:
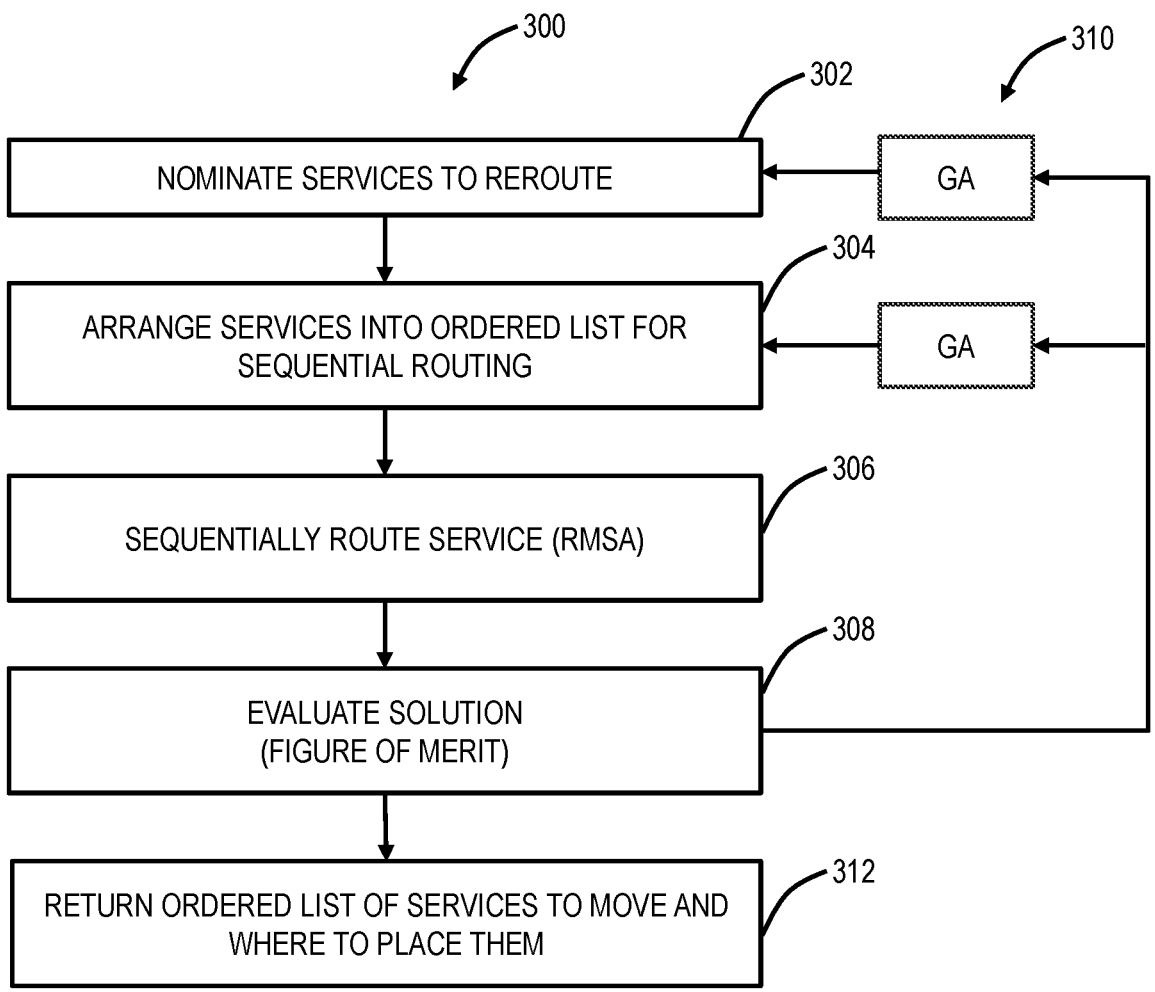
FIG. 4 is a flowchart of a classical de-fragmentation process.

The possible applications for the de-fragmentation component 256 include capacity upgrades on specific routes, technology migration (e.g., upgrading modems), moving traffic to new resources (e.g., newly installed fiber), re-routing to improve availability, and the like. FIG. 4 is a flowchart of a classical de-fragmentation process 300. The classical de-fragmentation process 300 includes nominating services to re-route (step 302), arranging the services into an ordered list for sequential routing (step 304), sequentially routing the services (including the use of RMSA) (step 306), evaluating the solution (to provide a Figure of Merit (FOM)) (step 308), feeding back the FOM to a Genetic Algorithm (GA) to nominates services to re-route and propose the order to use when sequentially (re-) routing them (step 310), and outputting an ordered list of services to move and where to place them (step 312). Of note, the classical de-fragmentation process 300 is performed in simulation, and the FOM is used for the quality of the solution with the GA used to improve that quality. When a "good enough" solution is determined, the list of services and their new routes are returned.

One important aspect is the output is a static view that needs to be implemented in multiple steps in the network.

This requires a static network to implement the output. Thus, there is a need for the de-fragmentation process 300 to run continuously with the network in simulations. The network would not need to be frozen until the full set of de-fragmentation operations is completed. Changes to the network would be recognized, and its solution would adapt.

In the de-fragmentation process 300, the genetic algorithm (GA) finds an ordered list of services to route, which will maximize a FOM. It is a very general solution but can take time to converge. It is also difficult to connect with the notion of a network value function.

The present disclosure provides new algorithms based on reinforcement learning, which are able to include other signals from the network beyond the FOM from the previous run. They will adapt the service selection and ordering as well as the RMSA routing parameters.

It is easy to have an intuition for which services should be considered for de-fragmentation based on observations or signals from the network such as those which cross edges that are highly congested, services which were difficult to route or ended up on paths that are much longer than the path in the absence of wavelength contention, paths that could move to newly installed capacity (new fibers), and the like.
Reinforcement Learning Engine for Network Re-Grooming Again, as the needs of a network change and new hardware and services are added, it is common to find that any of the RMSA of existing services is no longer optimal. It may be advantageous to perform a series of re-grooming operations where selected services are re-routed, i.e., re-grooming or de-fragmentation. Here re-routing is used to refer to any change to a service such as its routing, modulation, or spectral assignment.

The present disclosure includes a reinforcement learning approach that evaluate the present state of a network and recommends actions (service moves) that will maximize the cumulative network value at the end of the re-grooming episode. A key advantage of this approach over existing techniques is that it is able to consider network topology and granular measures of network fragmentation. The approach described herein is also able to adapt to changes in network state partway through the re-grooming operation, such as the addition of new services or opportunities created by maintenance activities. Another important advantage is that the present disclosure can present multiple de-fragmentation options at each step, along with quantitative estimates of the long-term benefit for each option. This approach could run as part of the Network Management System (NMS) for a live network where it could make suggestions for incremental improvements or it could be used offline to calculate an optimal multi-step re-grooming plan. Combinations of these two modalities are also envisioned.

A re-grooming process includes a series of time steps t that terminate at time T. At each time step, the process considers the state of the network $s_t$ and the set of possible actions $a_t$ where an action may include re-routing of a particular service. Other types of actions are contemplated, such as adding regenerators at specific locations, upgrading services with higher capacity modems, grouping channels into media channels, adding new physical hardware, and the like. For simplicity of illustration, this disclosure focuses on re-routing services, but the more expansive scenarios also apply. After an action is performed, a reward $r_t$ is calculated which may for example, indicate the resulting change in spectral fragmentation or whether the RMSA process was successful in placing the new service. At each time step, the objective is to select the action which maximizes the discounted cumulative reward for all subsequent actions in the re-grooming episode given by:

$$R_t = \sum_{t'=t}^{T} \gamma^{t'-t} r_{t'}$$

where $\gamma \leq 1$ is a discount factor that reduces the reward for actions taken in the future when rewards are less certain. This formulation allows for re-grooming operations that make the network worse in the short term if they enable later operations that maximize network value. Note that the action at time t is selected to maximize $R_t$ and this formulation is applicable to cases where rewards are only given at the end of the episode. This methodology is easily adapted to playing what-if scenarios where the implications of different traffic growth scenarios or changing customer goals are evaluated.

The selection of optimal actions at each time step can be informed by an action-value function or 'Q-function,' Q(s, a), which estimates the cumulative reward for taking action a from state s following policy π. The value-based RL process described herein may use a greedy policy which simply selects the action with the largest expected discounted cumulative reward:

$$\pi_Q(s) = \underset{a \in \mathcal{A}}{\mathrm{argmax}}\, Q(s, a), \quad (2)$$

where $\mathcal{A}$ is the set of possible actions in state s. The Q-function may be implemented as a deep neural network (DNN) with coefficients θ.

The use of RL is described in V. Mnih et al. "Human-level control through deep reinforcement learning," nature, 518, p. 529 (2015), the contents of which are incorporated by reference, where the authors taught a computer to win at Atari games by learning to estimate the value (likelihood of winning the game) for each joystick position given a series of screen images. Each game constitutes an episode. As the computer plays, it uses a recall memory to record the action that was selected for each state, the reward that was received and the discounted cumulative reward that was expected. At the end of the episode, the true rewards are known (whether the game was won), and the process works backward through the recall memory to calculate the correct discounted cumulative reward for each state-action pair that was encountered. This process repeats for many games, and a large database develops of state, action pairs and the error between the estimated and actual discounted cumulative rewards. This data is used to periodically update the Q-function parameters.

In an RL re-groom process, the networks are repeatedly re-groomed in simulation to train the Q-function to accurately estimate the value of possible re-grooming actions. Details are provided herein.
Network State One of the main challenges in RL is finding useful representations for the state and action spaces as well as appropriate rewards. The inputs used for RL re-groom are described as follows. The network state at a given time step includes an edge fragmentation score for each edge E in the network. An edge in a graph can be used to represent the links 120 in the network 100. This is represented as a vector of floating-point values of length |E|. There are many possible measures which could be incorporated into the edge fragmentation score such as Edge spectral fill percentage, Edge spectral fragmentation, Customer value parameter such as, e.g., how badly they want services removed from this edge, and the like.

The fragmentation score can be calculated analytically, or it could be learned with additional Neural Network (NN) stages, which would take all of the edge fragmentation metrics for a given edge as inputs. The same NN coefficients could be used to calculate the edge fragmentation score for all edges.

Actions

The possible action $a_t$ at time step t include selecting one service that is either routed in the network or is waiting in a queue to be routed. The selected service is directed to the RMSA process, which either re-routes it to a different configuration or places it in a queue of services waiting to be routed. The action of moving a service is represented by a vector which may incorporate any of the following inputs:

The path taken by the service. This could be represented with a vector of zeros of length |E| in 'one hot' notation with ones for any edges occupied by the service.
Ratio of the path length of the service relative to the shortest possible path in the absence of wavelength contention.
Measures of how difficult the service was to route.
Measures of how difficult it would be to route an additional service between the same endpoints.
Whether or not service is currently routed on the network (is it waiting in the queue).
Number of times the service has been moved during this de-fragmentation episode.
Number of time steps service has been waiting in the queue to be re-routed.
Customer supplied cost for disrupting this service.

Reward

If action $a_t$ is taken, the network will move to a new state s' and a reward r is given based on that outcome. The discounted cumulative reward Eq. (1) includes the immediate reward for a given transition as well as the rewards for future transitions up to the end of the episode. In some designs, no reward is given for individual transitions, and the only non-zero reward is calculated at the end of the de-fragmentation episode based on the measure of how successful the de-fragmentation steps were in satisfying the customer's objectives. The rewards can also be used to discourage transitions which place a service into the queue or policies that leave a service in the queue for too long. The true value for $R_t$ is not known until the end of the episode. The goal for value-based RL is to teach the Q-function to estimate it accurately.

Applications

The RL re-groom process is expected to be well suited to applications where we need to choose a sequence of steps to optimize a network and where we want the solution to adapt to take advantage of changing network conditions. This RL re-groom process can support the opportunistic de-fragmentation described herein.

In opportunistic de-fragmentation, the operator defines their objectives, and the process determines a de-fragmentation solution that maximizes the network value discounted by the transition costs. The operator can then chip away at this solution. The process can run as part of the NMS and is able to recognize changes in the network state, which change the optimum target state and de-fragmentation trajectory. For example, the de-fragmentation plan needs to be able to adapt to take advantage of a new maintenance window during which the cost of re-routing impacted services is substantially lower than usual.

A key requirement for opportunistic de-fragmentation is a process which can consider the current network state and recommend which action to take next to maximize future reward. The process may provide a full multi-step de-fragmentation plan but needs to be able to adapt that plan to changing network conditions. Another important advantage of using an RL re-groom process for optimizing a network is that it can present multiple options to the customer for the next re-grooming action and provide estimates of the expected future return for each choice.

Figure 5:
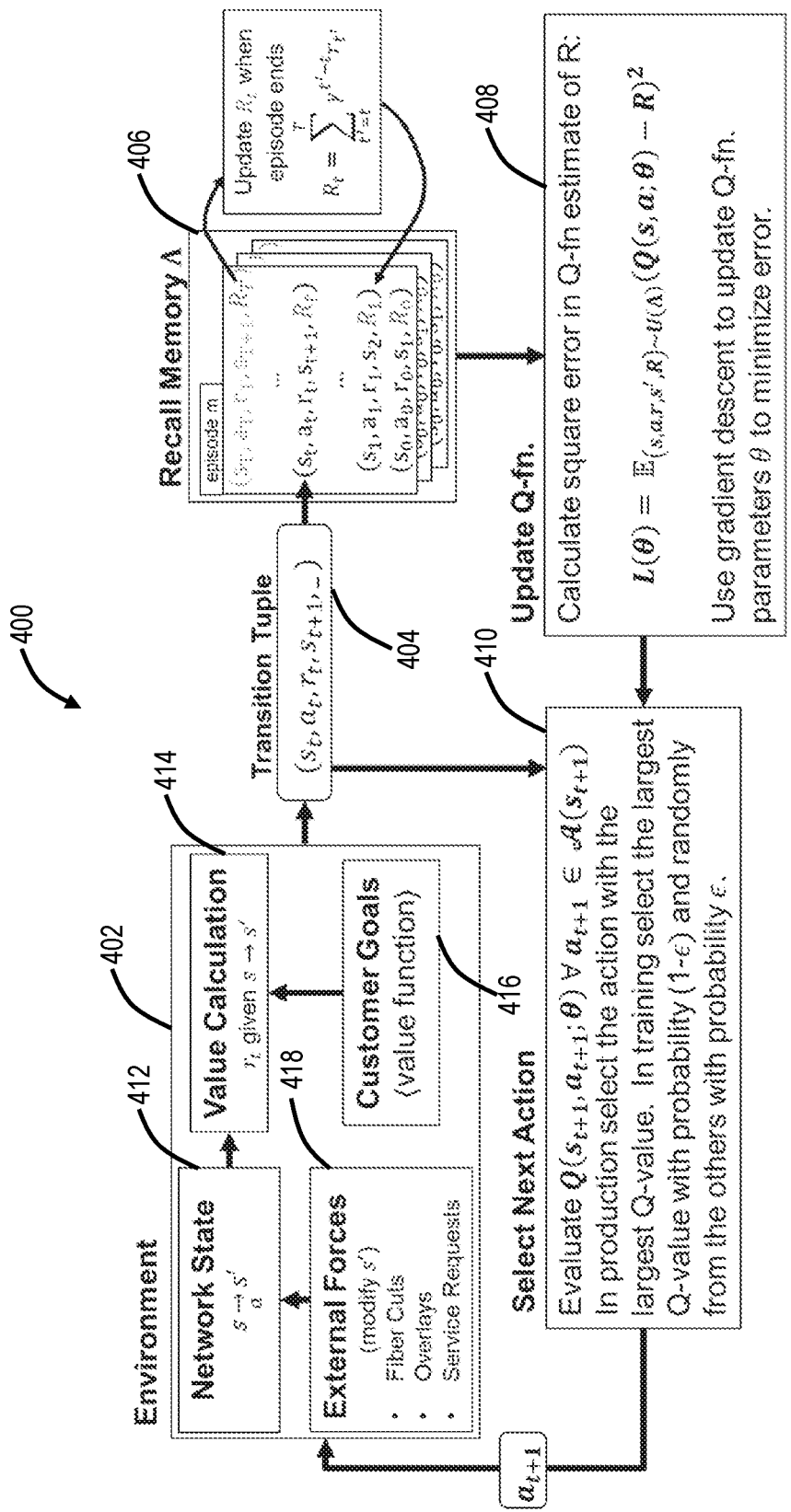
FIG. 5 is a block diagram of functionality performed in an RL re-grooming system based on RL.

FIG. 5 is a block diagram of functionality performed in an RL re-grooming system 400 based on RL. Note, the RL re-grooming system 400 contemplates implementation via the server 200, as a computer-implemented method, and/or as instructions stored in a non-transitory computer-readable medium for programming one or more processors. The RL re-grooming system 400 can be referred to as an agent, an engine, etc. The RL re-grooming system 400 includes an environment 402, a transition tuple 404, recall memory 406, an updated Q-function 408, and selection of a next action 410. The environment 402 includes a network state 412, a value 414 calculation, customer goals 416, and external forces 418.

For training, the RL re-grooming system 400 repeatedly executes in simulated de-fragmentation episodes beginning from some initial network state 412. At each time step, the network state 412 may be perturbed by random external forces 418, such as fiber cuts, and then its value 414 is estimated in consideration of the customer goals 416. Initially, no action is performed, and the initial transition tuple 404 of $(s_0, a_t=\text{nul.}, r_t=0, s_{t+1})$ is added to the recall memory 406. The next action 410 is selected with a parameterized Q-function 408 that estimates the discounted cumulative reward for each possible action (service re-route) from state $s_{t+1}$ given parameters $\theta$. The action with the largest reward is selected most of the time with a small probability $\epsilon$ from selecting among the others to encourage exploration. The new action $a_{t+1}$ enters the environment 402, where it modifies the network state 412, which is also perturbed by random external forces 418, and the process repeats. The transition tuple 404 for each re-grooming operation is recorded and, at the end of each re-grooming episode, the RL re-grooming system 400 works backward, updating the true discounted cumulative reward $R_t$ for each tuple. The recall memory 406 may include transitions from many re-grooming episodes. Periodically, the recall memory $\Lambda$ is randomly sampled, for example uniformly sampled $U(\Lambda)$, and the Q-function parameters adjusted to minimize the square error between the Q-function estimate of the cumulative reward and the observed value. These updated estimates are used for future action selection.

Training can run in pure simulation or can operate as a process within the NMS that considers the present network state and simulates de-fragmentation scenarios, including the impact of external forces 418, in order to improve the Q-function estimate of the reward for taking any future action on the network.

Figure 6:
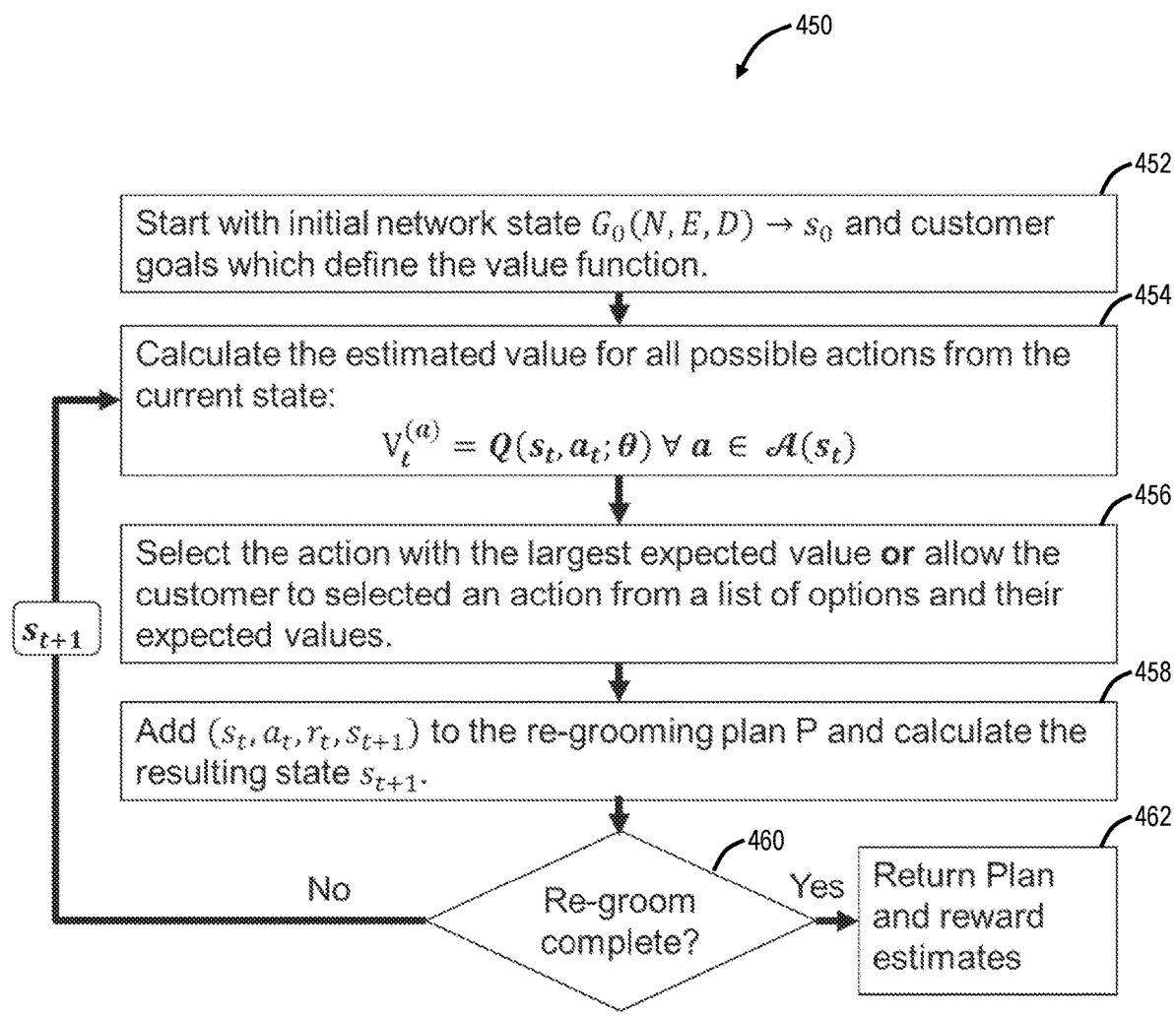
FIG. 6 is a flowchart of a process for using a parameterized Q-function for planning a re-grooming episode.

FIG. 6 is a flowchart of a process 450 for using a parameterized Q-function for planning a re-grooming episode. The process 450 is a calculation of a complete multi-step re-grooming plan starting from the initial network state. The operator describes the initial state of their network and their re-grooming goals (step 452). The parameterized Q-function that was determined through the RL re-grooming system 400 is used to calculate a series of actions (service moves) and their expected cumulative rewards (step 454). The action with the highest reward is chosen or the operator can select from the menu of possible actions and expected rewards (step 456). The state after the selected action is calculated, and the tuple $(s_t, a_t, r_t, s_{t+1})$ is added to the re-grooming plan (step 458). This process repeats until re-grooming is complete (steps 460, 462).

Once agreed to, the de-fragmentation plan can be executed on the network. At each step, the current network state is compared to the state that is expected at that point in the plan. If the actual and expected states agree the action is executed. If they differ, the solution from that point onward is no longer valid. The process 450 is then used to calculate a new optimal set of actions taking the current network state as a starting point.

The RL approach allows for continuous learning of the long-term reward that can be expected for taking various actions in the network. At any time, it is possible to evaluate actions and select one that is expected to improve the value of the network. This methodology can adapt to changing network conditions and allow exploitation of network events that make partial re-grooming possible at low cost, such as moving services that are impacted by maintenance activities.

Operating Principles

Again, the present disclosure includes a value-based RL approach which at time step t considers the network state $s_t$ and for each possible action uses a parameterized Q-function $Q(s_t, a_t, \theta)$ to estimate the discounted cumulative reward for taking that action. In an embodiment, the Q-function is implemented using a Deep Neural Network (DNN) and a series of training episodes are used to learn the DNN parameters θ that minimize differences between the estimated Q function and the true Q function $Q^*(s_t, a_t)$.

Once the Q-function is trained, the agent considers the current state and evaluates the Q-function for each possible action. A policy then selects the next action conditioned on the Q-function estimates. A common policy is one which selects the action with the largest Q-value, see Eq. (2).

Estimating the Action Value Function

The action-value function or 'Q-function' is the expected cumulative reward for taking action a from state s following policy π. The optimal Q-function $Q^*(s, a)$, is the expected return under a policy that selects the optimum action at all subsequent steps during the episode. This is captured by the recursive Bellman equation as:

$$Q^*(s, a) = \mathbb{E}_{s'}\left\{r + \gamma \max_{a'} Q^*(s', a') \mid s, a\right\}, \quad (3)$$

where s' are the states that can result from action a. In training, the goal is to learn a Q-function that approximates $Q^*$. This is done using the Bellman equation to iteratively update the estimated Q-function:

$$Q_{i+1}(s, a) = \mathbb{E}_{s'}\left\{r + \gamma \max_{a'} Q_i(s', a') \mid s, a\right\} \quad (4)$$

where the update at iteration i+1 uses the immediate rewards r that was observed for state s and action a as well as the estimated future reward using the previous iteration of the Q-function. Again, in an embodiment, a DNN is used to approximate the Q-function and training consists of updating the DNN coefficients θ.

Training

The reinforcement learning engine is trained in simulation over a series of de-fragmentation episodes. In each episode, the network begins in some initial fragmented state and is defragmented by sequentially re-routing services that are nominated by a policy. For off-policy training, a policy chooses actions that maximize the expected cumulative reward most of the time and explore other actions the rest of the time. The simplest example of this is an ε-greedy policy where from a given state $s_t$, the action with the largest Q-value is chosen with probability $$\left(1 - \epsilon + \frac{\epsilon}{|\mathcal{A}(s_t)|}\right)$$

and other actions are chosen with probability $$\frac{\epsilon}{|\mathcal{A}(s_t)|} \text{ for } \epsilon < 1.$$

During an episode, the state, action, reward, and new state are recorded at each time step as the agent's experience $e_t = \{s_t, a_t, r_t, s_{t+1}\}$ and added to an experience buffer $\Lambda = \{e_1, e_2, \ldots, e_T\}$ for that episode. At the conclusion of the episode, the true reward for each state-action pair is known, and the true discounted cumulative reward is calculated at each time step for the current policy using Eq. (1) and append the corresponding $R_t$ to each tuple.

At this stage, the error is calculated between the Q-function estimate of the future reward at each time step and the true value $R_t$ that was determined by following the current policy to the end and observing the outcomes. The Q-function parameters are adjusted to minimize the mean square of this error over all entries (or entries sampled from), the experience buffer by finding parameters θ that minimize the loss function:

$$L_\theta = \frac{1}{|\Lambda|} \sum_{e_{t'} \in \Lambda} (Q(s_{t'}, a_{t'}; \theta) - R_{t'})^2. \quad (5)$$

The Q-function's DNN coefficients are updated using well-known methods such as stochastic gradient descent, for example, using the ADAM algorithm, described in Kingma, Diederik P. and Jimmy Ba. "Adam: A Method for Stochastic Optimization." CoRR abs/1412.6980 (2015), the contents of which are incorporated by reference.

Designs which incorporate an additional parameter in the experience buffer which describes the position of the sample within the episode as well as those which aggregate experience across multiple training episodes are extensions of this design.

Additional Implementations

So far, an RL framework has been described where a Q-function considers the state of the network and estimates the value for re-routing a given service (action). The state and action spaces are small enough that they can be used as inputs to a DNN-based Q-function even for large networks. The action space could be extended to include the new path that a service would move onto. In one instantiation, the action of re-routing a service is considered. In simulation, that service is removed from the network and re-routed with an RMSA algorithm that finds the k-best alternative routes.

It has been described herein as representing the original path taken by a service with a vector of length |E| where each entry is either one or zero depending on whether or not the service crossed the corresponding edge. This vector constituted part of the action space for the Q-function. The action space could be augmented with an additional vector of length |E| that captures the path for one of the k-best candidate paths returned by the RMSA algorithm. The Q-function would be trained as described earlier and would gain the ability to recommend which service to re-route and which of the k-best routes to move that service on.

Hybrid solutions are also contemplated where a Q-function is first used to identify the M most promising services to re-route. For each of those services, the k-best alternate paths are determined, and then an additional Q-function is used to estimate the value for each of the M×k service-route combinations. The combination with the largest value is selected and routed onto the best of the k-alternate routes.

The extension of the value-based formulation described herein to other RL formulations including action-based formulations where the DNN directly recommends which action to take for a given state is also contemplated herein. Based on this implementation of the re-grooming problem in terms of RL other more advanced methods for selecting optimal actions such as Monte Carlo tree search are contemplated; see, e.g., Sutton, Richard S., and Andrew G. Barto, Reinforcement learning: An introduction. MIT press, 2018, the contents of which are incorporated by reference.

Other interesting hybrid solutions exist, such as those where a DNN estimates the value for re-routing a particular service, and a second DNN recommends which RMSA tuning parameters to use in order to achieve optimal routing.

Also, the present disclosure has been described with reference to re-routing (re-grooming) optical services at Layer 0, i.e., wavelengths or spectrum. Those skilled in the art will appreciate the same techniques can be applied at Layer 1, i.e., Time Division Multiplexing (TDM), such as Optical Transport Network (OTN) services. It should be noted that the proposed RL re-optimization engine can also be applied to L1 networks, i.e., TDM such as OTN, SONET, etc. In essence, the L0 and L1 fragmentation problems are very similar and are caused by the sub-optimal use of resources (link capacity). This is mainly due to the dynamic addition and deletion of connections, and to the fact that many services may not be using an optimal route, as resources were freed since they were first established. L1 traffic being by definition more volatile, additional feedback from the network may be considered such as historical traffic data, changes in network topology, load distribution, forecasted traffic and blocking probability. In this context, the RL re-groom process learns from traffic trends and topology information, and adapts to the evolving network state by suggesting actions such as the re-routing of targeted services.

Re-Grooming System

Figure 7:
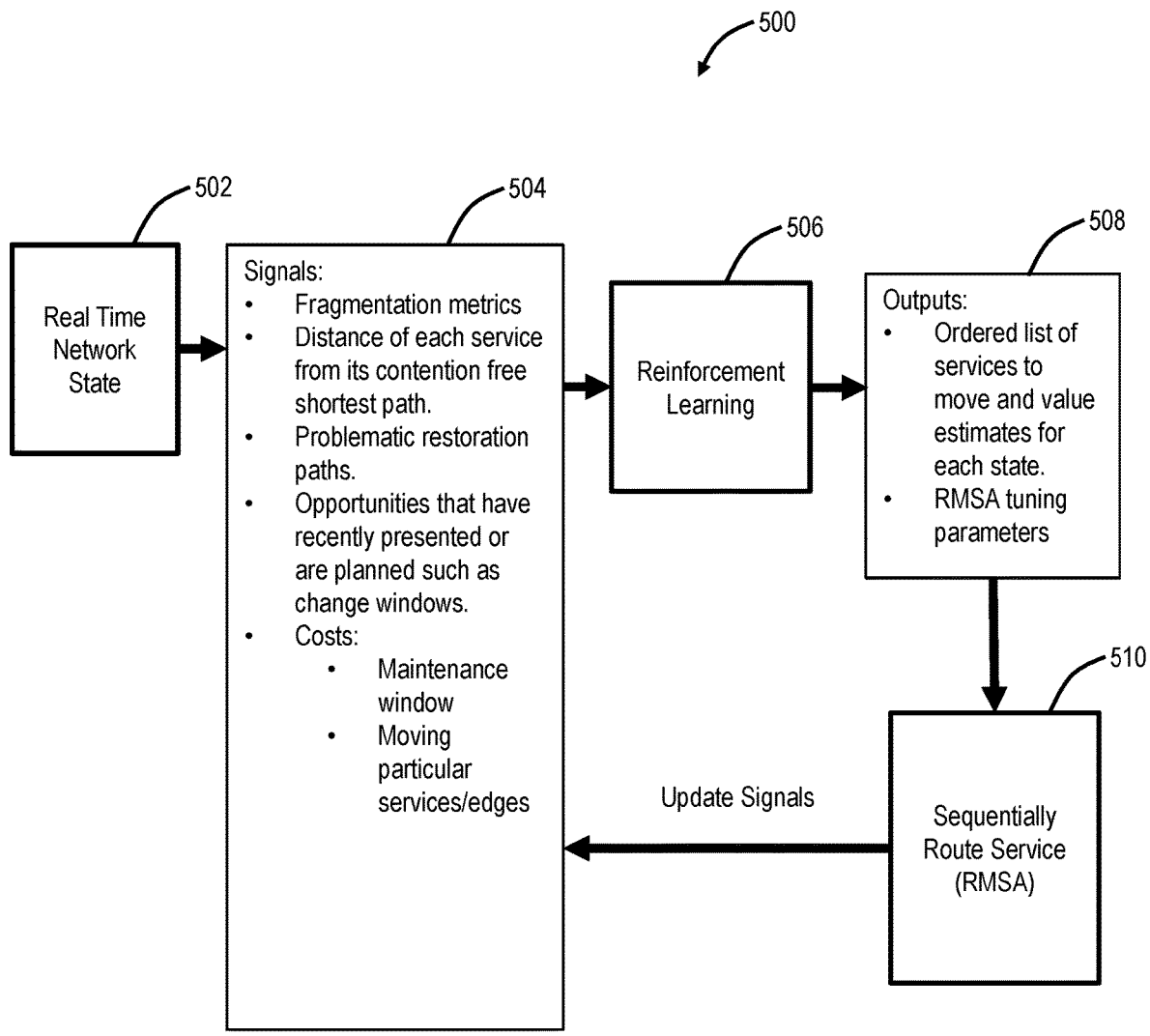
FIG. 7 is a block diagram of a re-grooming system 500 utilizing the RL techniques described herein.

FIG. 7 is a block diagram of a re-grooming system 500 utilizing the RL techniques described herein. Note, the re-grooming system 500 contemplates implementation via the server 200, as a computer-implemented method, and/or as instructions stored in a non-transitory computer-readable medium for programming one or more processors. The re-grooming system 500 can be referred to as an agent, an engine, etc. As described herein, the re-grooming system 500 can operate continuously, on-demand, periodically, etc. Again, the advantage of the RL techniques described herein is they can be used to develop a re-grooming plan at any point during the operation of the network. As such, this can be used with the opportunistic de-fragmentation approach described herein. Network operators do not want to develop a large-scale re-grooming plan that has to be implemented before there are network changes. The approach described herein allows steps towards improving the network in an incremental manner.

The re-grooming system 500 obtains a network state 502 that are analyzed into signals 504. The signals are provided to an RL engine 506 that can operate as described herein with the RL re-grooming engine 400 and the process 450. The outputs 508 can be sequentially implemented, such as via a sequential route service (RMSA) 510, and newly updated signals are provided.

RL Re-Grooming Process

Figure 8:
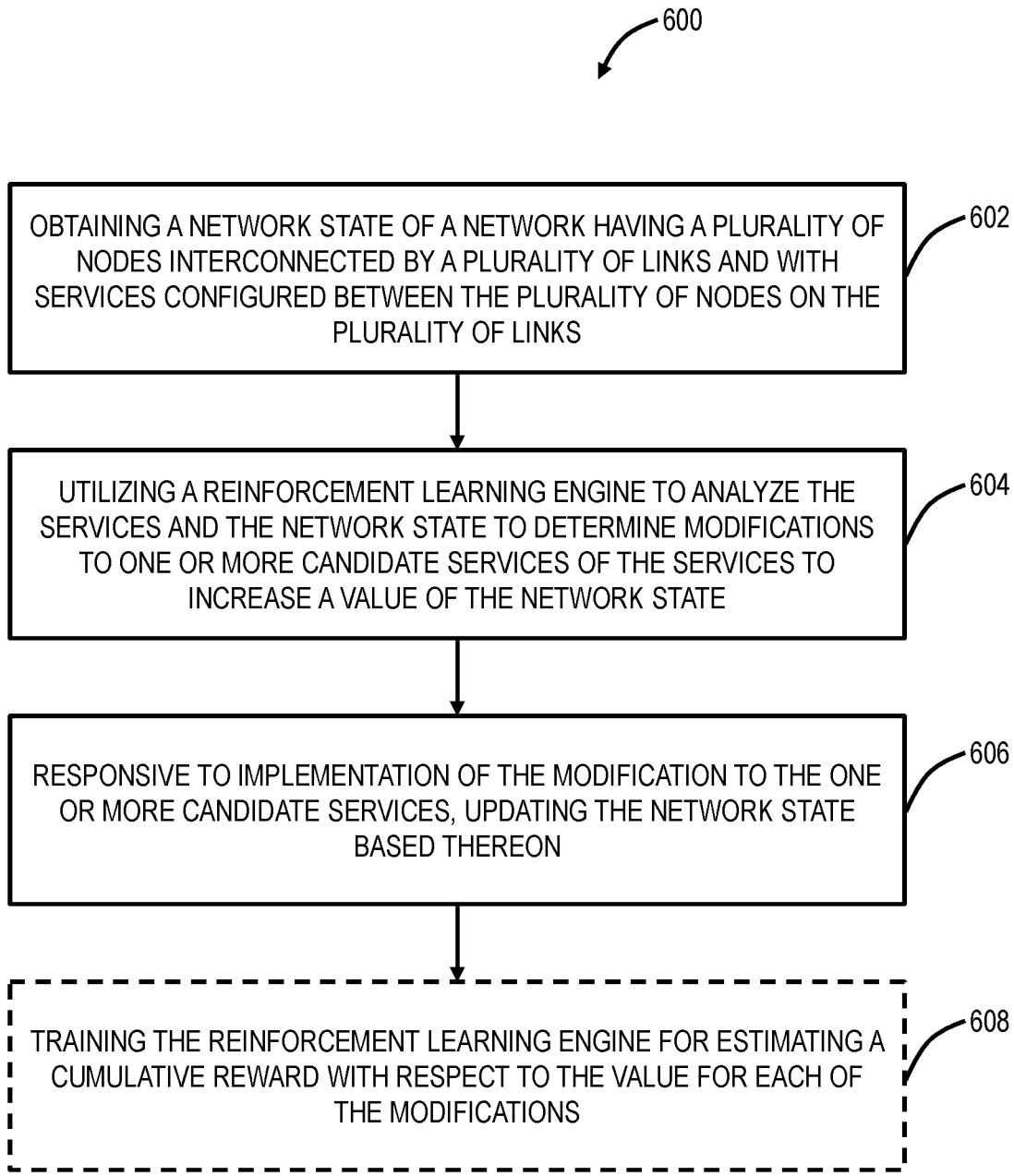
FIG. 8 is a flowchart of an RL re-grooming process.

FIG. 8 is a flowchart of an RL re-grooming process 600. Again, the RL re-grooming process 600 contemplates implementation via the server 200, as a computer-implemented method, and/or as instructions stored in a non-transitory computer-readable medium for programming one or more processors. The RL re-grooming process 600 includes obtaining a network state (recent or real-time) of a network having a plurality of nodes interconnected by a plurality of links and with services configured between the plurality of nodes on the plurality of links (step 602); utilizing a reinforcement learning engine to analyze the services and the network state to determine modifications to one or more candidate services of the services to increase a value of the network state (step 604); and, responsive to implementation of the modification to the one or more candidate services, updating the network state based thereon (step 606). Here real-time refers to operating on a live network where the network state represents a current view of the network state and is typically on the order of milliseconds to several hours old.

The modifications can include changes to any of routing, modulation, and spectral assignment to the one or more candidate services. The modifications can include any of adding physical hardware to the network including adding regenerators, migrating services to use higher capacity modems, and grouping channels together into a media channel.

The reinforcement learning engine can be configured to evaluate the real-time network state and provide the modifications to one or more candidate services each providing some increase in the value of the real-time network state, such as described with respect to the RL re-grooming system 400, the process 450, and the re-grooming system 500. The real-time network state can include signals sensitive to any of topology of the network, link utilization, link spectral fragmentation, link participation in earlier blocking events, cost to increase link optical bandwidth, link contribution to latency, link optical path length, link path redundancy, customer supplied value, and value returned by a value function.

The value of the real-time network state can be quantified by values for the services based on any of source node, destination node, links which a corresponding service crosses, path length relative to a shortest path in the absence of spectral contention, difficulty to route, latency, cost of disrupting the corresponding service, and customer value. The reinforcement learning engine can include a determination of a reward after each action that includes the modification, wherein the reward is utilized to determine the value, and wherein the reward is determined from any of fragmentation, survivability, latency, capacity, and output of a customer supplied value function.

Here customer supplied values or value functions may be provided directly by the customer, sales engineers or other agents acting on behalf of the customer or by any other party such as a manufacture or software provider.

The RL re-grooming process 600 can further include training the reinforcement learning engine for estimating a cumulative reward with respect to the value for each of the modifications (step 608). The estimating can be based on any of a parameterized deep neural network, a parameterized function, and a lookup table. The estimating can be determined through one or more of simulation of events on the network and analyzing historical network data. The implementation can be based on an opportunity in the network. The services can include any of optical channels and Time Division Multiplexed (TDM) channels.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming one or more processors to performs steps of:
  obtaining a network state of a network having a plurality of nodes interconnected by a plurality of links and with services configured and operating between the plurality of nodes on the plurality of links;
  utilizing a reinforcement learning engine to analyze the services and the network state to determine modifications to one or more candidate services of the services to increase a value of the network state, wherein the reinforcement learning engine considers cost for disrupting the one or more candidate services, wherein the modifications include changes to any of 1) any of routing, modulation, and spectral assignment to the one or more candidate services, 2) adding physical hardware, 3) migrating the one or more candidate services to use higher capacity modems, 4) grouping channels together into a media channel, 5) changing restoration paths, and 6) changing provisioning of physical hardware; and
  responsive to implementation of the modifications to the one or more candidate services, updating the network state based thereon,
  wherein the reinforcement learning engine utilizes a graph of the network state with one or more edges including a per edge fragmentation score based on a plurality of i) spectral fill, ii) spectral fragmentation, iii) a number of times a given edge was involved in a blocking event in path computation, iv) link utilization, v) link participation in earlier blocking events, vi) cost to increase link bandwidth, vii) length, viii) redundancy, ix) latency, and x) a user defined parameter weighted towards how much an operator wants services removed from the given edge.

2. The non-transitory computer-readable medium of claim 1, wherein the reinforcement learning engine is configured to evaluate the network state and provide the modifications to one or more candidate services each providing some increase in the value of the network state.

3. The non-transitory computer-readable medium of claim 1, wherein the network state includes signals sensitive to any of topology of the network, link utilization, link spectral fragmentation, link participation in earlier blocking events, cost to increase link optical bandwidth, link contribution to latency, link optical path length, link path redundancy, customer supplied value, and value returned by a value function.

4. The non-transitory computer-readable medium of claim 1, wherein the value of the network state is quantified by values for the services based on any of source node, destination node, links which a corresponding service crosses, path length relative to a shortest path in the absence of spectral contention, difficulty to route, latency, cost of disrupting the corresponding service, and customer value.

5. The non-transitory computer-readable medium of claim 1, wherein the reinforcement learning engine includes a determination of a reward after each action that includes the modifications, wherein the reward is utilized to determine the value of the network state, and wherein the reward is determined from any of fragmentation, survivability, latency, capacity, and output of a customer supplied value function.

6. The non-transitory computer-readable medium of claim 1, wherein the steps further include
training the reinforcement learning engine for estimating a cumulative reward with respect to the value of the network state for each of the modifications.

7. The non-transitory computer-readable medium of claim 6, wherein the estimating is based on any of a parameterized deep neural network, a parameterized function, and a lookup table.

8. The non-transitory computer-readable medium of claim 6, wherein the estimating is determined through one or more of simulation of events on the network and analyzing historical network data.

9. The non-transitory computer-readable medium of claim 1, wherein the implementation is based on an opportunity in the network.

10. The non-transitory computer-readable medium of claim 1, wherein the services include any of optical channels and Time Division Multiplexed (TDM) channels.

11. A method comprising:
obtaining a network state of a network having a plurality of nodes interconnected by a plurality of links and with services configured and operating between the plurality of nodes on the plurality of links;
utilizing a reinforcement learning engine to analyze the services and the network state to determine modifications to one or more candidate services of the services to increase a value of the network state, wherein the reinforcement learning engine considers cost for disrupting the one or more candidate services, wherein the modifications include changes to any of 1) any of routing, modulation, and spectral assignment to the one or more candidate services, 2) adding physical hardware, 3) migrating the one or more candidate services to use higher capacity modems, 4) grouping channels together into a media channel, 5) changing restoration paths, and 6) changing provisioning of physical hardware; and
responsive to implementation of the modifications to the one or more candidate services, updating the network state based thereon,
wherein the reinforcement learning engine utilizes a graph of the network state with one or more edges including a per edge fragmentation score based on a plurality of i) spectral fill, ii) spectral fragmentation, iii) a number of times a given edge was involved in a blocking event in path computation, iv) link utilization, v) link participation in earlier blocking events, vi) cost to increase link bandwidth, vii) length, viii) redundancy, ix) latency, and x) a user defined parameter weighted towards how much an operator wants services removed from the given edge.

12. The method of claim 11, wherein the reinforcement learning engine includes a determination of a reward after each action that includes the modifications, wherein the reward is utilized to determine the value of the network state, and wherein the reward is determined from any of fragmentation, survivability, latency, capacity, and output of a customer supplied value function.

13. The method of claim 11, further comprising
training the reinforcement learning engine for estimating a cumulative reward with respect to the value of the network state for each of the modifications.

14. The method of claim 11, further comprising
performing the implementation based on an opportunity in the network.

15. A non-transitory computer-readable medium having instructions stored thereon for programming one or more processors to performs steps of:
obtaining a network state of a network having a plurality of nodes interconnected by a plurality of links and with services configured and operating between the plurality of nodes on the plurality of links;
utilizing a reinforcement learning engine to analyze the services and the network state to determine modifications to one or more candidate services of the services to increase a value of the network state, wherein the reinforcement learning engine considers cost for disrupting the one or more candidate services, wherein the modifications include any of adding physical hardware to the network, migrating the one or more candidate services to use higher capacity modems, and changing provisioning of physical hardware; and
responsive to implementation of the modifications to the one or more candidate services, updating the network state based thereon,
wherein the reinforcement learning engine utilizes a graph of the network state with one or more edges including a per edge fragmentation score based on a plurality of i) spectral fill, ii) spectral fragmentation, iii) a number of times a given edge was involved in a blocking event in path computation, iv) link utilization, v) link participation in earlier blocking events, vi) cost to increase link bandwidth, vii) length, viii) redundancy, ix) latency, and x) a user defined parameter weighted towards how much an operator wants services removed from the given edge.

16. The non-transitory computer-readable medium of claim 15, wherein the reinforcement learning engine is configured to evaluate the network state and provide the modifications to one or more candidate services each providing some increase in the value of the network state.

17. The non-transitory computer-readable medium of claim 15, wherein the network state includes signals sensitive to any of topology of the network, link utilization, link spectral fragmentation, link participation in earlier blocking events, cost to increase link optical bandwidth, link contribution to latency, link optical path length, link path redundancy, customer supplied value, and value returned by a value function.

18. The non-transitory computer-readable medium of claim 15, wherein the value of the network state is quantified by values for the services based on any of source node, destination node, links which a corresponding service crosses, path length relative to a shortest path in the absence of spectral contention, difficulty to route, latency, cost of disrupting the corresponding service, and customer value.

19. The non-transitory computer-readable medium of claim 1, wherein the steps further include
prior to the implementation of the modifications, providing a plurality of options to a user for the modifications along with associated values of each of the plurality of options; and
receiving a selection of the plurality of options for the implementation of the modifications.

* * * * *